United States Patent [19]

Balzer et al.

[11] 4,250,766
[45] Feb. 17, 1981

[54] SHAFT PULLER

[75] Inventors: David J. Balzer, East Peoria; James D. Sickinger, Peoria, both of Ill.

[73] Assignee: Caterpillar Tractor Co., Peoria, Ill.

[21] Appl. No.: 6,820

[22] Filed: Jan. 26, 1979

[51] Int. Cl.³ .......................................... F16H 57/00
[52] U.S. Cl. ..................................................... 74/405
[58] Field of Search .......................................... 74/405

[56] References Cited

U.S. PATENT DOCUMENTS

| 2,435,122 | 1/1948 | Berndt | 74/405 |
| 2,709,327 | 5/1955 | Heth | 74/405 X |
| 3,504,563 | 4/1970 | Polak | 74/405 |
| 3,504,564 | 4/1970 | Kell | 74/405 |
| 3,687,249 | 8/1972 | Priest et al. | 74/405 X |
| 3,800,901 | 4/1974 | Blomstrom et al. | 180/9.62 |
| 3,807,249 | 4/1974 | Cheek et al. | 74/405 |
| 3,835,722 | 9/1974 | Bertram et al. | 74/405 |
| 3,949,823 | 4/1976 | Herr | 74/405 X |
| 3,960,230 | 6/1976 | Van Wuytswinkel | 74/405 |
| 4,041,792 | 8/1977 | Miller | 74/405 |

Primary Examiner—Lawrence J. Staab
Attorney, Agent, or Firm—Wegner, Stellman, McCord, Wiles & Wood

[57] ABSTRACT

A power drive assembly (10) wherein a driven member (14), such as an input clutch gear of a final drive (11), is removably connected to a driving member (12) by a shaft (17), such as a quill shaft, having splined connection (19,20) to the driving member (12) and splined connection (22,23) to the driven member (14). A control rod (24) is connected to the quill shaft (17) and is adjustably positioned within a final drive shaft (15) of power drive assembly (10) so as to effect selectively connection and disconnection of the quill shaft splines relative to the driving member (12) and driven member (14). Access to the control rod is through an opening (39) in a wall portion (38) of the power drive assembly housing (35) which may be selectively closed by a closure member (40) and which is adapted to mount a pulling device (43) removably connected to the control rod. The assembly (10) is arranged to permit disconnection of the driving member from the driven member so as to permit independent operation of the vehicle engine when desired, or to permit towing of the vehicle with the final drive (11) disconnected from the driving member (12) when desired. The arrangement further permits the removal of the bevel gear of the cross shaft drive arrangement when desired without removing the final drive (11).

13 Claims, 3 Drawing Figures

SHAFT PULLER

TECHNICAL FIELD

This invention relates to power drive assemblies and in particular to a cross shaft drive arrangement having means for facilitating rearrangement thereof to allow removal of the bevel gear or allow the vehicle in which the drive arrangement is provided to be towed with the engine drive effectively disconnected.

BACKGROUND ART

In U.S. Pat. No. 4,041,792 of Calvin L. Miller, which patent is owned by the assignee hereof, a power drive assembly is shown wherein the driving member is normally engaged with a rotary driven shaft through a spline connection. A cage is mounted to the housing in alignment with the driven shaft and is rotatably attached thereto so that rotation of the cage slidably moves the driven shaft from an engaged position of the spline connection to a disengaged position thereof. Means are provided for indicating the disposition of the driven shaft in the disengaged arrangement.

In U.S. Pat. No. 3,504,563 of James C. Polak, an external final drive disconnect device is shown for use with a transmission drive assembly permitting field preparation of the vehicle in which the drive assembly is mounted for towing thereof. Means are provided accessible at the hub of the drive wheel for moving the quill shaft sun gear and the internally splined final drive input shaft to a new position so that the final drive input shaft is disconnected from the splined coupling member while permitting the sun gear to remain in mesh with the planet pinions of the drive.

A similar structure is shown in U.S. Pat. No. 3,504,564 of Nathaniel B. Kell.

In U.S. Pat. No. 3,800,901 of Gary D. Blomstrom et al, which patent is owned by the assignee hereof, a final drive assembly is shown wherein a quill shaft is connected to reduction gearing coupled to a track driving sprocket and means are provided for disconnecting the quill shaft from the reduction gearing or the motor in situations where it is necessary to tow the vehicle with the motor inoperable. Braking means are associated with the input side of the reduction gearing to lock the gearing when the motor is inoperable.

DISCLOSURE OF THE INVENTION

The present invention comprehends an improved power drive assembly wherein the driven member thereof, such as a quill shaft, is selectively connected to the driving member of the assembly by means of a control rod which is longitudinally movable through the final drive shaft of the drive assembly so as to permit the power drive assembly to be disconnected by repositioning of only the quill shaft thereof.

The power drive assembly of the present invention comprehends the use of an axial control rod longitudinally displaceable in the final drive shaft and having an inner end connected to the quill shaft so as to effectively position the quill shaft so as to have splined engagement with the driving member or be disconnected therefrom as a function of the positioning of the control rod.

In the illustrated embodiment, the quill shaft is further splined to the clutch means and, thus, provides the driving connected between the driving member and the clutch of the final drive assembly. The positioning of the quill shaft to disconnect the shaft from the driving member may further disconnect the splined connection of the quill shaft to the clutch means so as to permit the final drive assembly to be operated as in towing of the vehicle in which it is mounted without effecting rotation of the quill shaft as well as the driving member.

Thus, the disconnection of the quill shaft permits facilitated removal of the bevel gear of the power drive assembly or selectively facilitates rearrangement of the power drive assembly to permit the vehicle in which it is installed to be towed. Such rearrangment of the power drive assembly is effected without requiring the removal of the final drive and, thus, provides an improved simplified construction providing facilitated selective arrangement of the power drive assembly for the purposes discussed above.

BRIEF DESCRIPTION OF THE DRAWING

FIG. 1 is a fragmentary section of a power drive assembly having means for selectively connecting the driving member to the final drive embodying the invention;

FIG. 2 is a view similar to that of FIG. 1 but with the power drive assembly arranged in the disconnected disposition; and FIG. 3 is a fragmentary view illustrating a modified form of power drive assembly similar to that of the embodiment of FIGS. 1 and 2 but utilizing a two-piece quill shaft structure.

BEST MODE FOR CARRYING OUT THE INVENTION

In the illustrative embodiment of the invention as disclosed in the drawing, a power drive assembly generally designated 10 is arranged for use such as in a vehicle for driving a final drive generally designated 11 from a driving member generally designated 12 which may be driven by the engine of the vehicle (not shown) in the normal manner. The present invention is concerned with the connection between the driving member 12 and the final drive 11 and, thus, only those portions of the power drive assembly associated therewith necessary for a complete understanding of the invention are shown. As will be obvious to those skilled in the art, any suitable form of driving means may be associated with the driving member 12 and any suitable final drive arrangement may be utilized as the final drive fragmentarily shown in the drawing.

Figures 1, 2, 3:
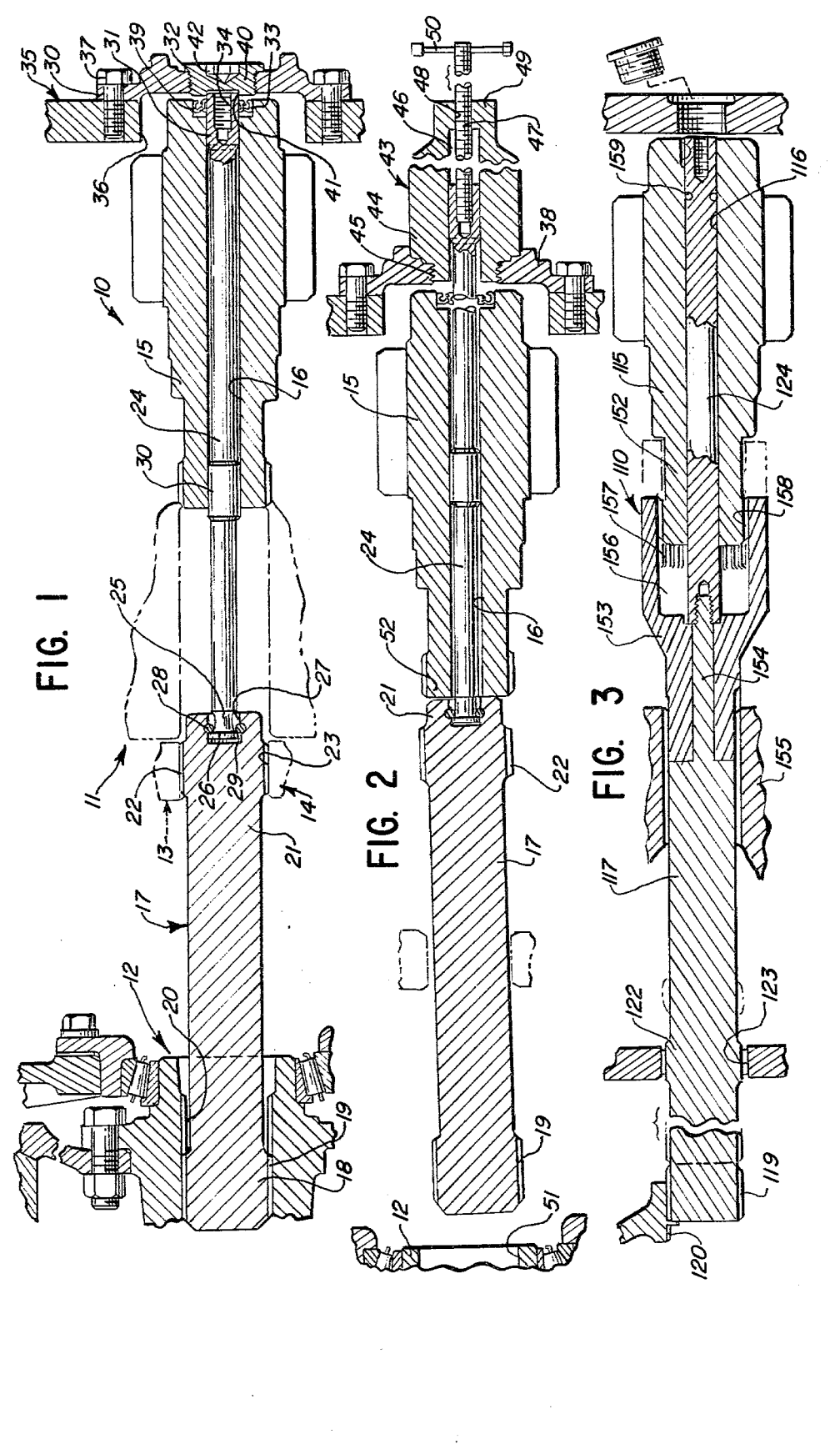

In the illustrated embodiment, the final drive is driven through suitable clutch means generally designated 13 more specifically defining an input clutch gear 14. The final drive further includes a final drive shaft 15 which, as shown in FIG. 1, defines an axial through bore 16.

The connection between the driving member 12 and driven clutch gear member 14 is provided herein by means of a quill shaft 17. More specifically, one end 18 of the quill shaft is provided with suitable spline means 19 engageable with spline means 20 of the driving member 12.

The outer, or other, end 21 of the quill shaft 17 defines a spline means 22 engageable with a complementary spline means 23 of the clutch input gear 14. Thus, when the splines 19, 20, 22 and 23 are in respective engagement, the final drive is driven from the driving member 12 through the quill shaft 17. The present invention comprehends an improved means for disconnecting the splined engagement of the quill shaft relative to the driving member 12 and final drive input gear 14.

More specifically, the invention comprehends the provision of a control rod 24 coaxially rotatably extending through the bore 16 of the final drive gear 15 and having an inner end portion 25 defining a head 26 received in an outwardly opening annular recess 27 disposed coaxially in the quill shaft outer end 21. Suitable dowels 28 may be provided for locking head 26 in the recess and an annular gasket 29 may be provided between the inner end of the head 26 and the bottom of recess 27, as shown in FIG. 1. Thus, the control rod head 26 is effectively captured between the dowels 28 and gasket 29.

The control rod may be provided with an enlarged cylindrical midportion 30 rotatably mounting the control rod in the final drive shaft 15. The outer end of the control rod may similarly define a cylindrical enlarged portion 31 rotatably mounting the outer end of the control rod in the bore 16.

The outer end 31 of the control rod extends outwardly through an axial recess 32 in the outer end of the final drive shaft 15 and an annular seal 33 is provided surrounding the control rod end 31 within the recess. Outer end 31 further defines an axial threaded recess 34.

The power drive assembly 10 may be enclosed within a suitable housing fragmentarily shown at 35 defining a wall portion having an opening 36 across which is removably mounted, by means of suitable bolts 37, a cover plate 38. The cover plate, in turn, is provided with a threaded opening 39 which is aligned with the final drive shaft recess 32 and control rod end 31. The opening 39 is selectively closed by a plug 40 which may be threaded thereinto so as to urge a thrust washer 41 against the outer end of the control rod 31 about the recess 34. The plug may be provided with an outwardly opening noncircular recess 42 for facilitated threading of the plug into and from the threaded opening 39 of the cover plate 38.

Thus, as shown in FIG. 1, when the quill shaft 17 is arranged for interconnecting the driving member 12 and the final drive 11, the control rod 24 is disposed inwardly of the housing cover plate 38 with its outer end received substantially within the final drive shaft 15. In this disposition, the spline 22 of quill shaft 17 is aligned with the spline 23 of the clutch input gear 14 and the spline 19 of the quill shaft is meshed with the spline 20 of the driving gear member 12.

As shown in FIG. 2, when it is desired to disconnect the connection between driving member 12 and the final drive assembly 11, the plug 40 is removed from the cover plate opening 39 and a puller device generally designated 43 is installed. More specifically, the puller device includes a body 44 having a threaded inner end 45 threadedly receivable in the threaded opening 39 of the cover plate. The body defines an inwardly opening cylindrical recess 46 and a threaded rod 47 is threaded through a threaded opening 48 in the outer end 49 of the body so as to be thrded into the threaded recess 34 in the outer end 31 of the control rod 24. The outer end of the threaded rod may be provided with a handle 50 for facilitating the threaded engagement of the rod with the threaded recess 34.

Thus, once the rod 47 is connected to the outer end of the control rod 24, as shown in FIG. 2, an outward pull on handle 50 causes the control rod to be displaced coaxially within the bore 16 of the final drive shaft 15, thereby pulling the spline 19 of the quill shaft 17 outwardly from the spline 20 of the driving gear 12 and displacing the spline 22 of the quill shaft 17 from the spline 23 of the clutch gear 14, thereby breaking the connection between the driving means and driven means of the power drive assembly and permitting independent operation of the vehicle engine or towing of the vehicle without connection to the engine as desired.

As shown in FIG. 2, the driving gear 12 may define a frustoconical outer axial recess portion 51 for guiding the spline 19 into coaxial relationship with the spline 20 upon reverse, or leftward, movement of the control rod and quill shaft 17 from the position of FIG. 2 back to the connected position of FIG. 1.

As shown in FIG. 2, outer end 21 of the quill shaft 17 abuts the inner end 52 of the final drive shaft 15 at the outer limit of movement of the quill shaft so as to provide a positive indication of the disconnection of the driving means.

In the connected arrangement, as shown in FIG. 1, the control rod 24 is effectively locked against axial displacement both by the head 26 cooperating with dowels 28 and the outer end 31 of the rod bearing against the thrust washer 41 captured by the plug 40, as discussed above.

Referring now to the embodiment of FIG. 3, a power drive assembly generally designated 110 is shown to comprise an assembly generally similar to that of power drive assembly 10 except that the quill shaft 117 includes a connecting portion 153 having an inner end mounted on a cylindrical extension 154 of the shaft 117 and splined to a drive member 155 of the drive assembly.

The outer end of the connector 153 defines an outwardly opening recess 156 receiving the inner end 152 of the final drive shaft 115. The recess 156 defines internal splines 157 selectively engageable with splines 158 on the final drive shaft end 152.

The control rod 124 has a substantially constant diameter throughout its length and, thus, is rotatable in the bore 116 of the final drive shaft throughout its length.

Thus, in the embodiment of FIG. 3, the quill shaft 117 is axially positionable as a result of the axial movement of the control rod 124 so as to selectively disengage the splines 119 and 122 thereon from the associated splines 120 and 123 to provide the desired disconnection.

The control rod 124 may be sealed to the drive shaft 115 by a suitable seal 159 in lieu of the seal 33 of the assembly 10.

Thus, the power drive assembly 110 is similar to the power drive assembly 10 and functions in a similar manner in providing selective connection and disconnection of the drive train for the use of the selectively positionable control rod extending through the final drive shaft. Elements of power drive assembly 110 which are similar to those of power drive assembly 10 are identified by similar but 100 higher reference numerals.

Industrial Applicability

The power drive assembly of the present invention may be utilized in vehicles and the like wherein it is desirable at times to disconnect the cross shaft of the vehicle without removing the final drive and wherein it is desirable at times to allow for towing of the vehicle without removal of the final drive.

The invention may be utilized in connection with such power drive assemblies wherein an outer housing is provided for enclosing the assembly. A portion of the wall means defining the outer housing may comprise means for mounting a pulling device to be removably connected to the control rod of the power drive assembly structure in selectively effecting the positioning of the quill shaft to provide the selective connection and disconnection of the driving member relative to the driven member of the assembly.

As will be obvious to those skilled in the art, the provision of the improved control rod means extending through the final drive shaft may be utilized in conjunction with various forms of power drive assemblies, the illustrative form being exemplary only.

Other aspects, objects and advantages of this invention can be obtained from a study of the drawings, the disclosure and the appended claims. The foregoing disclosure of specific embodiments is illustrative of the broad inventive concepts comprehended by the invention.

We claim:

1. In a power drive assembly (10) having a rotatable driving member (12), a rotatable drive transfer means (14), a driven member (17) in selectively driven association with said driving member and in selectively driving association with said drive transfer means, wall means (38) spaced outwardly of said driven member and provided with an access opening (39), and a longitudinally fixed, rotatable final drive shaft (15) extending coaxially of said driven member to a position inwardly adjacent said access opening, said final drive shaft being driven by said drive transfer means, the improvement comprising:
   positioning means (24) extending rotatably coaxially through said final drive shaft and being selectively adjustable through said access opening; and
   means (21,26,28) responsive to adjustment of said positioning means (24) for positioning said driven member selectively in driven and non-driven association with said driving member and correspondingly in driving and nondriving association with said drive transfer means, said driven member being arranged to move into nondriving association with said drive transfer means prior to movement thereof into nondriven association with said driving member.

2. The power drive assembly of claim 1 wherein said positioning means (24) is axially displaceable in said final drive shaft (15) and said driving (12) and driven (14) members are provided with coaxial separable spline means (19,20) for providing the selective driven and nondriven association thereof as a function of the relative axial positioning thereof by said positioning means.

3. The power drive assembly of claim 1 wherein said positioning means (24) includes connecting means (21,26,28) connecting the positioning means to said driven member at all times.

4. The power drive assembly of claim 1 wherein said positioning means (24) includes rotatable connecting means (21,26,28) connecting the positioning means to said driven member while permitting relative rotation therebetween at all times.

5. The power drive assembly of claim 1 wherein said drive transfer means comprises connectng clutch means (13) for driving said final drive shaft (15) and means (22,23) separably coaxially connecting said connecting clutch means to said driven member to be driven thereby when said driven member (14) is in driven association with said driving member (12).

6. The power drive assembly of claim 1 wherein said positioning means (24) comprises a shaft rotatably coaxially mounted in said final drive shaft (15) for selective axial displacement therein.

7. The power drive assembly of claim 1 wherein said positioning means (24) comprises a shaft rotatably coaxially mounted in said final drive shaft (15) for selective axial displacement therein, and said power drive assembly (10) further includes removable thrust washer means (40,41) extending across said access opening for selectively preventing axial outward displacement of said positioning means shaft.

8. In a power drive assembly (10) having a final drive mechanism (11) including an input clutch means (14) and a final drive shaft (15), and a driving means including a rotatable driving member (12), the improvement comprising:
   a quill shaft (17) coaxially splined to said driving member (12);
   input clutch means (13) coaxially splined to said quill shaft for driving the final drive mechanism (11) from said quill shaft;
   a control rod (24) coaxially rotatably mounted in said final drive shaft (15);
   means (26,28) connecting one end (25) of said control rod to said quill shaft (17); and
   means (43) for selectively axially positioning said control rod (24) to position said quill shaft (17) selectively (a) in splined interconnecting relationship with both said driving member (12) and input clutch means (13), (b) in disconnected relationship with said input clutch means, and (c) in disconnected relationship with both said driving member and input clutch means for permitting independent movement of either of said driving means (12) and said final drive mechanism (11).

9. The power drive assembly of claim 8 further including a housing (35) enclosing said final drive mechanism (11) and having wall means (38) defining an access opening (39) aligned with said control rod (24), said positioning means (43) being removably mounted to said wall means (38) for engagement with said control rod (24) for adjusting the disposition of the control rod and thereby permit control of the connection and disconnection of the quill shaft (17) through the final drive shaft (15) with the final drive shaft being maintained in place within said housing (35).

10. The power drive assembly of claim 8 further including a housing (35) enclosing said final drive mechanism (11) and having wall means (38) defining an access opening (39) aligned with said control rod (24), said positioning means (43) being removably mounted to said wall means (38) for engagement with said control rod (24) for adjusting the disposition of the control rod and thereby permit control of the connection and disconnection of the quill shaft (17) through the final drive shaft (15) with the final drive shaft being maintained in place within said housing (35), and further including means (40,41) removably carried by said wall means (38) for selectively preventing outward displacement of said control rod (24) to maintain said quill shaft (17) splined to said driving member (12) and input clutch (13) in the driving arrangement of the power drive assembly (10).

11. The power drive assembly of claim 8 further including a housing (35) enclosing said final drive mechanism (11) and having wall means (38) defining an access opening (39) aligned with said control rod (24), said positioning means (43) being removably mounted to said wall means (38) for engagement with said control rod (24) for adjusting the disposition of the control rod and thereby permit control of the connection and disconnection of the quill shaft (17) through the final drive shaft (15) with the final drive shaft being maintained in place within said housing (35), and further including means (40,41) removably carried by said wall means (30) for selectively preventing outward displacement of said control rod (24) to maintain said quill shaft (17) splined to said driving member (12) and input clutch (13) in the driving arrangement of the power drive assembly (10), said means for preventing outward displacement of the control rod (24) comprising a member (40) threaded to said wall means (38) in said access opening (39).

12. The power drive assembly of claim 8 further including a housing (35) enclosing said final drive mechanism (11) and having wall means (38) defining an access opening (39) aligned with said control rod (24), said positioning means (43) being removably mounted to said wall means (38) for engagement with said control rod (24) for adjusting the disposition of the control rod and thereby permit control of the connection and disconnection of the quill shaft (17) through the final drive shaft (15) with the final drive shaft maintained in place within said housing (35), and further including means (40,41) removably carried by said wall means (38) for selectively preventing outward displacement of said control rod (24) to maintain said quill shaft (17) splined to said driving member (12) and input clutch (13) in the driving arrangement of the power drive assembly (10), said means for preventing outward displacement of the control rod (24) comprising a member (40) threaded to said wall means (38) in said access opening (39), and a thrust washer (41) disposed between said member (40) threaded to the wall means and an outer end (31) of the control rod.

13. The power drive assembly of claim 8 further including a housing (35) enclosing said final drive mechanism (11) and having wall means (35) defining an access opening aligned with said means for positioning the control rod (24), said positioning means (43) being removably mounted to said wall means (38) for engagement with said control rod (24) for adjusting the disposition of the control rod and thereby permit control of the connection and disconnection of the quill shaft (17) through the final drive shaft (15) with the final drive shaft being maintained in place within said housing (35), and further including means (40,41) removably carried by said wall means (38) for selectively preventing outward displacement of said control rod (24) to maintain said quill shaft (17) splined to said driving member (12) and input clutch (13) in the driving arrangement of the power drive assembly, said means for preventing outward displacement of the control rod (24) comprising a member (40) threaded to the wall means (38) and an outer end (31) of the control rod (24), said power drive assembly (10) further including a thrust gasket (29) between the inner end (25) of the control rod (24) and the quill shaft (17) to permit inward positioning of the control rod (24) relative to the housing wall means (38).

* * * * *